United States Patent
Babayev

(10) Patent No.: US 10,129,379 B2
(45) Date of Patent: *Nov. 13, 2018

(54) VOICE ONLY PHONE AND METHOD OF OPERATION

(71) Applicant: Anatoliy Babayev, Mountain View, CA (US)

(72) Inventor: Anatoliy Babayev, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/407,070

(22) Filed: Jan. 16, 2017

(65) Prior Publication Data

US 2017/0126871 A1    May 4, 2017

Related U.S. Application Data

(63) Continuation-in-part of application No. 14/752,622, filed on Jun. 26, 2015, now Pat. No. 9,680,977.

(60) Provisional application No. 62/017,338, filed on Jun. 26, 2014.

(51) Int. Cl.

| | |
|---|---|
| *H04M 1/00* | (2006.01) |
| *H04B 1/38* | (2015.01) |
| *H04M 1/27* | (2006.01) |
| *H04M 1/725* | (2006.01) |
| *H04W 4/14* | (2009.01) |
| *H04M 1/60* | (2006.01) |
| *G10L 15/06* | (2013.01) |
| *G10L 15/22* | (2006.01) |

(52) U.S. Cl.
CPC ....... *H04M 1/271* (2013.01); *H04M 1/72594* (2013.01); *H04W 4/14* (2013.01); *G10L 15/063* (2013.01); *G10L 15/22* (2013.01); *H04M 1/605* (2013.01); *H04M 1/6041* (2013.01); *H04M 1/72552* (2013.01); *H04M 2250/74* (2013.01)

(58) Field of Classification Search
CPC .. H04M 1/271; H04M 2250/74; H04M 1/605; H04W 4/14; G10L 15/22
USPC .......................................................... 455/563
See application file for complete search history.

(56) References Cited

U.S. PATENT DOCUMENTS

| | | | |
|---|---|---|---|
| 8,942,247 B1 * | 1/2015 | Alapuranen .......... | H04W 60/00 370/325 |
| 2004/0209653 A1 * | 10/2004 | Chandhok ............. | H04M 1/271 455/563 |

(Continued)

FOREIGN PATENT DOCUMENTS

EP    0194387 A2    9/1986

*Primary Examiner* — Eugene Yun

(57) ABSTRACT

A voice only phone and method of operation; the voice only phone having a microprocessor configured to operate an interactive voice respondent (IVR) that is used to verbally interact with a user. The IVR allows the user to interact with the voice only phone to place calls, receive calls, receive text messages, and respond to text messages using only voice commands. Furthermore, the IVR allows for the dynamic creation of a voice phone book that is progressively updated. In order to better recognize the voice of the user, the voice only phone creates a voice profile through a voice recognition setup sequence, wherein the user is prompted to dictate a plurality of audible calibration inputs.

Once the voice profile is created, the user is able to place phone calls by either dictating a contact name or a plurality of digits for a phone number.

18 Claims, 20 Drawing Sheets

(56) References Cited

U.S. PATENT DOCUMENTS

2006/0009264 A1\* 1/2006 Seo ................... H04M 1/56
  455/563
2013/0072237 A1 3/2013 Ramdeo \* cited by examiner

VOICE ONLY PHONE AND METHOD OF OPERATION

The current application is a continuation in part of U.S. patent application Ser. No. 14/752,622 filed on Jun. 26, 2015 which claims a priority to the U.S. Provisional Patent Application Ser. No. 62/017,338 filed on Jun. 26, 2014.

FIELD OF THE INVENTION

The present invention relates generally to mobile phones. More specifically, the present invention is a voice only phone that utilizes an interactive virtual respondent for voice recognition and operation via voice commands.

BACKGROUND OF THE INVENTION

Section 255 of the Communications Act, as amended by the Telecommunications Act of 1996, requires that cell phone manufacturers and service providers do all that is "readily achievable" to make each product or service accessible. Although, there are tons of "smart" phones with millions of features on the market, there is still no single phone designed specifically for blind and visually impaired people. Smartphones require touching and looking on screen to manage the phone book, which is difficult for visually impaired people. While some smartphones do have limited support for visually impaired people, such device are typically very expensive as they include touchscreens, cameras, etc., many components of which are of little to no use to the visually impaired. As a result, visually impaired users end up paying for tons of features that are not used. Furthermore, almost all smartphones have challenges with voice recognition accuracy, accents, and specific words.

The prevalent use of smartphones has also led to an increase in the number of people texting and driving. Texting and driving is dangerous, as in the United States alone over 5,000 drivers die each year due to an accident involving texting. This a major area of concern for many parents, especially those of children just learning to drive. Apart from the dangers of texting and driving, more and more parents want to give their kids simple phone where they can simply make a call to check how their kid is doing without fear that an expensive phone can be broken, lost or that their kid will get addicted to games on a smartphone. Many parents do not feel that their child is responsible yet for an expensive phone, or fear that their child will get addicted to technology but still want to be able to communicate with their child.

As previously mentioned, most smartphones are expensive devices. Not only are smartphone expensive, but they are also very fragile and prone to breaking easily. As such, cases and screen protectors are often used to protect smartphones from being dropped, scratched, etc. Some cases are even designed to prevent water damage, which smartphone are very susceptible to. Such cases and screen protectors are often expensive accessories, thus further increasing the cost of owning a smartphone. In addition to having fragile components, smartphones also often deal with battery issues, as large amounts of energy are consumed in order to power the components, such as the touchscreen and backlights.

Therefore it is the object of the present invention to provide a voice only phone and a method for operating the voice only phone using an interactive virtual respondent (IVR). The voice only phone is simplistic in nature, having no touchscreen and only one external control button in the form of an activation switch. The IVR allows a user to interact with the voice only phone to place calls, receive calls, receive text messages, and respond to text messages using only voice commands. Furthermore, the IVR allows for the dynamic creation of a voice phone book that is progressively updated. In order to better recognize the voice of the user, the voice only phone creates a voice profile through a voice recognition setup sequence, wherein the user is prompted to dictate a plurality of audible calibration inputs. Once the voice profile is created, the user is able to place phone calls by either dictating a contact name or a plurality of digits for a phone number.

DETAIL DESCRIPTIONS OF THE INVENTION

Figure 1:
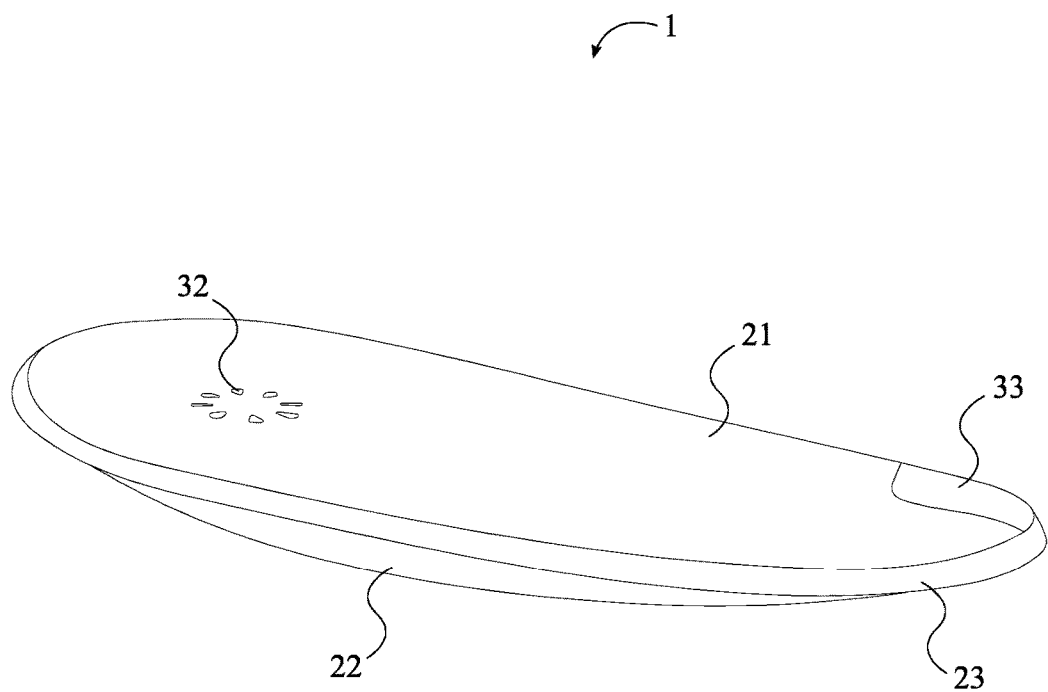
FIG. 1 is a top perspective view of the voice only phone.

All illustrations of the drawings are for the purpose of describing selected versions of the present invention and are not intended to limit the scope of the present invention.

The present invention is a voice only phone 1 and a method for operating the voice only phone 1. The voice only phone 1 comprises a phone case 2, an electronics assembly 3, a battery 4, and an activation switch 5. An interactive virtual respondent (IVR) is operated through the electronics assembly 3, allowing a user to verbally communicate with the voice only phone 1, thus eliminating the need for a touchscreen or any other external controls aside from the activation switch 5. The simplistic nature of the voice only phone 1 leads to increased life of the battery 4, as the battery 4 does not need to power any energy exhaustive components. Additionally, less processing power is needed (and thus less power) do to the nature of the functions made available through the voice only phone 1.

Figure 2:
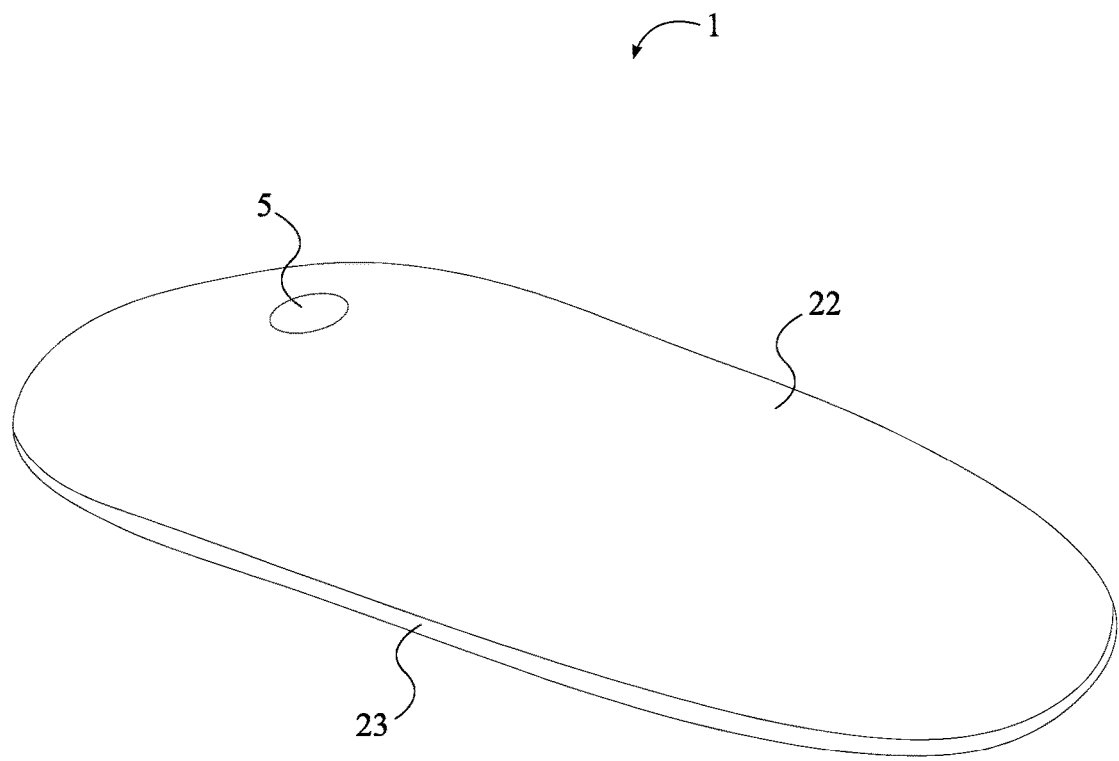
FIG. 2 is a bottom perspective view of the voice only phone.

In reference to FIG. 1-2, the phone case 2 comprises a first shell 21, a second shell 22, and a bumper 23. Together, the first shell 21, the second shell 22, and the bumper 23 form an elongated enclosure for housing the electronics assembly 3, the battery 4, and the activation switch 5. The bumper 23 is perimetrically connected to the first shell 21, while the second shell 22 is perimetrically connected to the bumper 23 opposite the first shell 21; the first shell 21 forming the top half of the voice only phone 1 and the second shell 22 forming the bottom half of the voice only phone 1. In the preferred embodiment of the present invention, the first shell 21 is concave, while the second shell 22 is convex; the resulting shape increases the ergonomics of the voice only phone 1 when being held. Additionally, the curved nature of the first shell 21 and the second shell 22 aid in the buoyancy of the voice only floating, allowing the voice only phone 1 to float.

In addition to holding together the first shell 21 and the second shell 22, the bumper 23 also serves as a form of protection for the voice only phone 1 by absorbing impact forces that could occur from dropping the voice only phone 1, bumping the voice only phone 1 into a surface, etc. Furthermore, the bumper 23 can provide increased friction between another surface to prevent the voice only phone 1 from slipping, such as when positioned in a pocket. In the preferred embodiment of the present invention, the bumper 23 is constructed from rubber, however, in other embodiments of the present invention the bumper 23 can be constructed from any other material, preferably having similar high friction and pliable properties.

Figure 3:
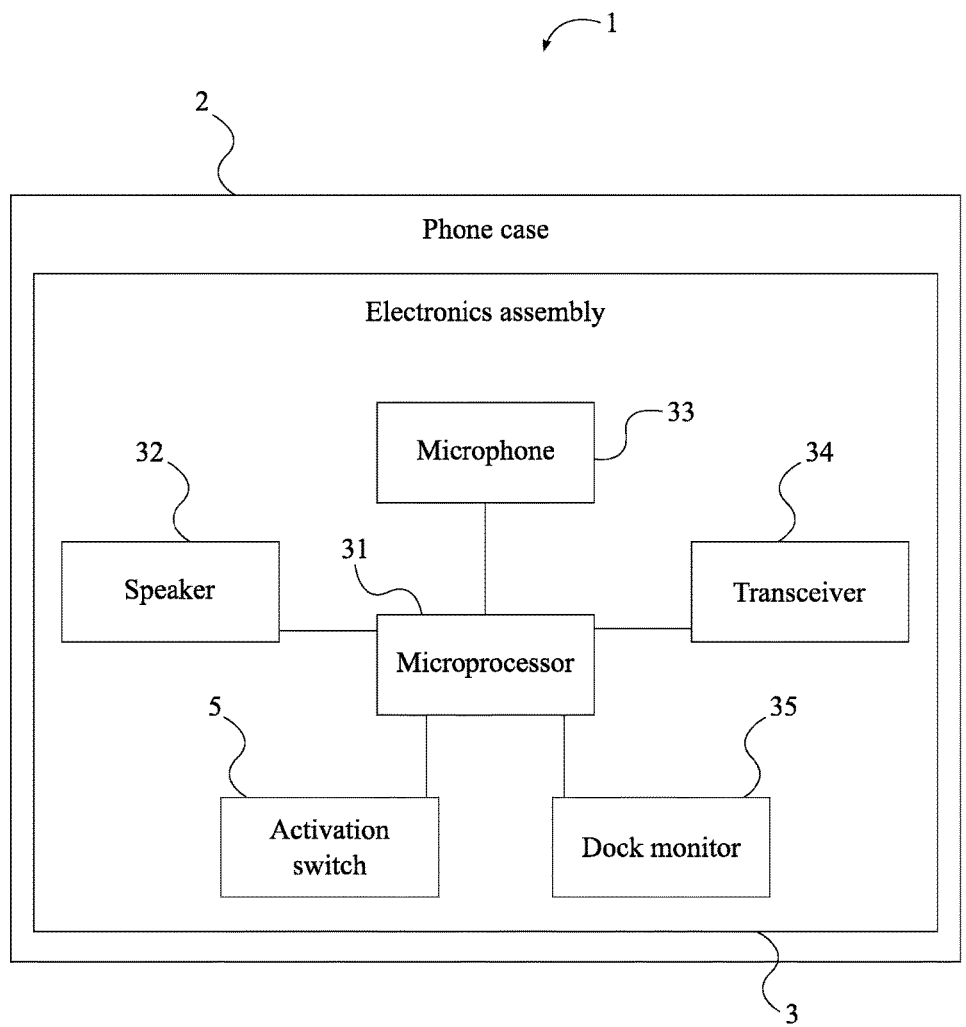
FIG. 3 is a diagram depicting the electronic connections with the microprocessor.
Figure 4:
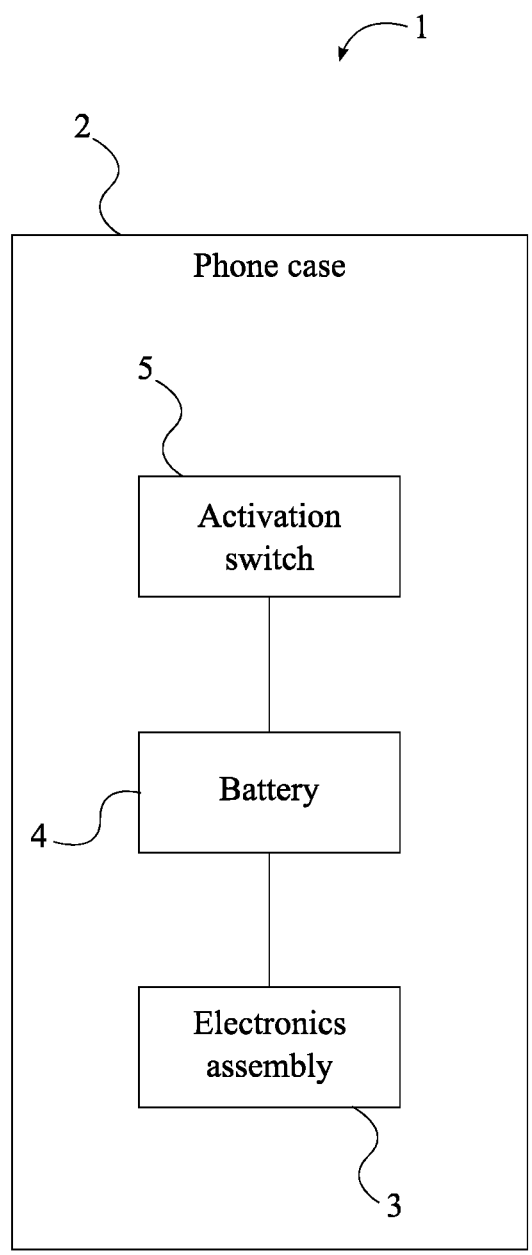
FIG. 4 is a diagram depicting the electrical connections with the battery.

In reference to FIG. 3-4, the electronics assembly 3 and the battery 4 are positioned within the phone case 2; depending on the embodiment of the voice only phone 1, the activation switch 5 may also be positioned within the phone case 2. The electronics assembly 3 provides the means for communication between the user and the voice only phone 1, and communication between the voice only phone 1 and an electronic device of a subsequent user. As such, the electronics assembly 3 comprises a microprocessor 31, a speaker 32, a microphone 33, and a transceiver 34. The microprocessor 31 is configured to operate the IVR, which allows the voice only phone 1 to adapt to the unique voice of the user, and store and associate phone numbers with individual contacts.

The microprocessor 31 receives electronic signals from the microphone 33 and the transceiver 34 and outputs electronic signals through the speaker 32 and the transceiver 34. As such, the microphone 33, the speaker 32, and the transceiver 34 are electronically connected to the microprocessor 31, as depicted in FIG. 3. The microphone 33 receives voice input from the user and directs the resulting electronic signals to the microprocessor 31, the speaker 32 outputs audio based on electronic signals received from the microprocessor 31, and the transceiver 34 exchanges electronic signals between the microprocessor 31 and the electronic device of the subsequent user for voice to voice communication.

The speaker 32 and the microphone 33 are positioned adjacent to the first shell 21 and positioned opposite each other along the phone case 2. The concave nature of the first shell 21 assists in blocking out environmental noise when the voice only phone 1 is being operated, thus allowing for more precise voice recognition via the IVR. The ability to block out environmental noise also makes it easier for the user to hear from the speaker 32, particularly when the voice only phone 1 is held against the head.

The electronics assembly 3 further comprises an at least one noise cancellation microphone. The at least one noise cancellation microphone is positioned opposite the microphone 33 along the phone case 2, and opposite the speaker 32 about the phone case 2, wherein the at least one noise cancellation microphone is positioned adjacent to the second shell 22. When the user is speaking into the microphone 33, the at least one noise cancellation microphone picks up environmental noises. The noise picked up by the microphone 33 and the noise picked up by the at least one noise cancellation microphone are processed and compared by the microprocessor 31 using a noise reduction algorithm to single out the unique voice of the user from the environmental noise. As such, the at least one noise cancellation microphone is electronically connected to the microprocessor 31.

The battery 4 provides current to power the electronics assembly 3 and the activation switch 5, and as such the electronics assembly 3 and the activation switch 5 are electrically connected to the battery 4, as depicted in FIG. 4. The activation switch 5 is used to change the power state of the electronics assembly 3. The activation switch 5 can be used to power off the electronics assembly 3, wherein no current is supplied to the electronics assembly 3, thus calls cannot be sent or received and the user cannot interact with the IVR. Subsequently, the activation switch 5 can also power on the electronics assembly 3, wherein current is supplied to the electronics assembly 3.

Furthermore, the activation switch 5 can be used to toggle the electronics assembly 3 between an off state and an on state. When the voice only phone 1 is in the on state, actuation of the activation switch 5 causes the IVR to prompt the user with a power off message. If the user agrees with the power off message, then the IVR powers off the voice only phone 1. If the user does not agree to the power off message, then the IVR does not power off the voice only phone 1. In the preferred embodiment, the power off message is prompted after holding the activation switch 5 for 3 seconds. When the voice only phone 1 is in the off state, actuation of the activation switch 5 causes the microprocessor 31 to power on and launch the IVR. In the preferred embodiment, the power on state is actuated after holding the activation switch 5 for 2 seconds.

In one embodiment of the present invention, the activation switch 5 is a push button, wherein the activation switch 5 is positioned though the phone case 2. More specifically, the activation switch 5 is positioned through the second shell 22, such that the activation switch 5 is accessible on the back of the voice only phone 1. When the activation switch 5 is pressed or held, the electronics assembly 3 is switched to the appropriate power state.

In another embodiment of the present invention, the activation switch 5 is a motion sensor, wherein the activation switch 5 is positioned within the phone case 2. The activation switch 5 being the motion sensor can be an accelerometer, a gyroscope, or a similar sensor that is capable of detecting the phone case 2 being shook, or otherwise disturbed. When the activation switch 5 detects that the phone case 2 is motion, the electronics assembly 3 is switched to the appropriate power state.

Figure 5:
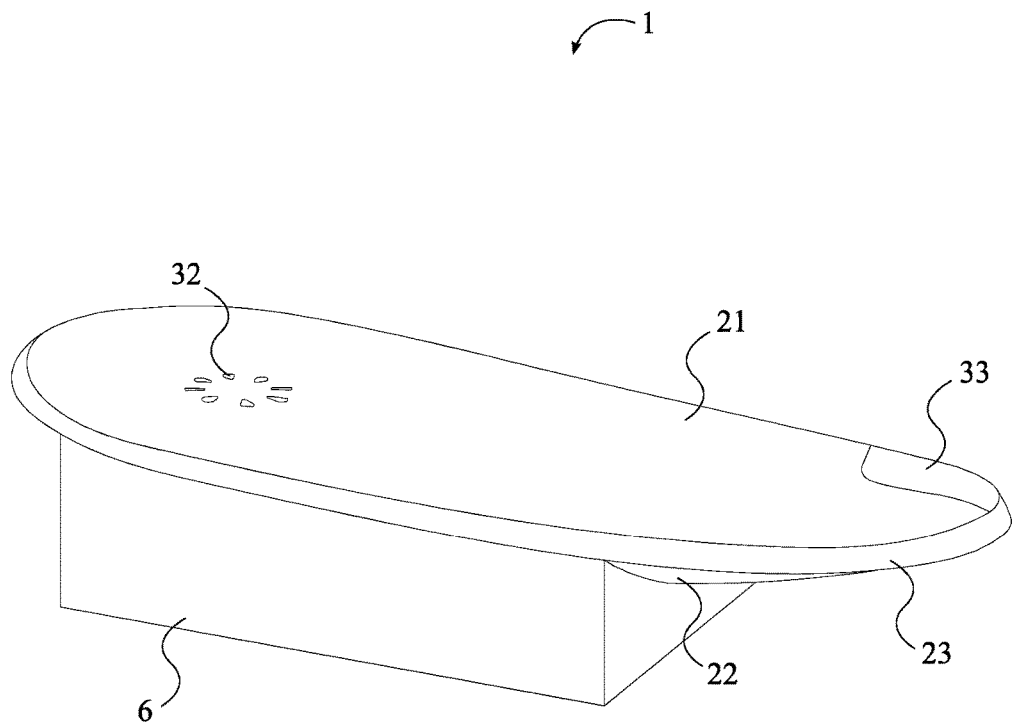
FIG. 5 is a perspective view of the voice only phone positioned in the charging station, wherein the dock monitor is communicably coupled to the charging station.
Figure 6:
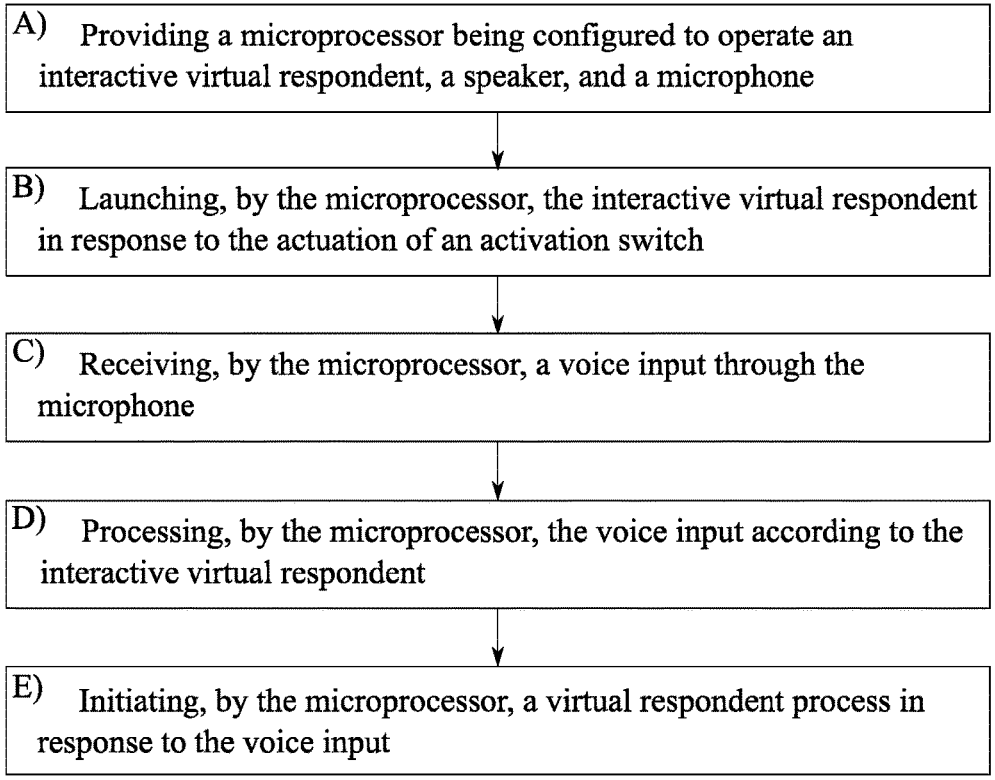
FIG. 6 is a flowchart depicting the steps for interacting with and controlling the voice only phone through user voice input.
Figure 14:
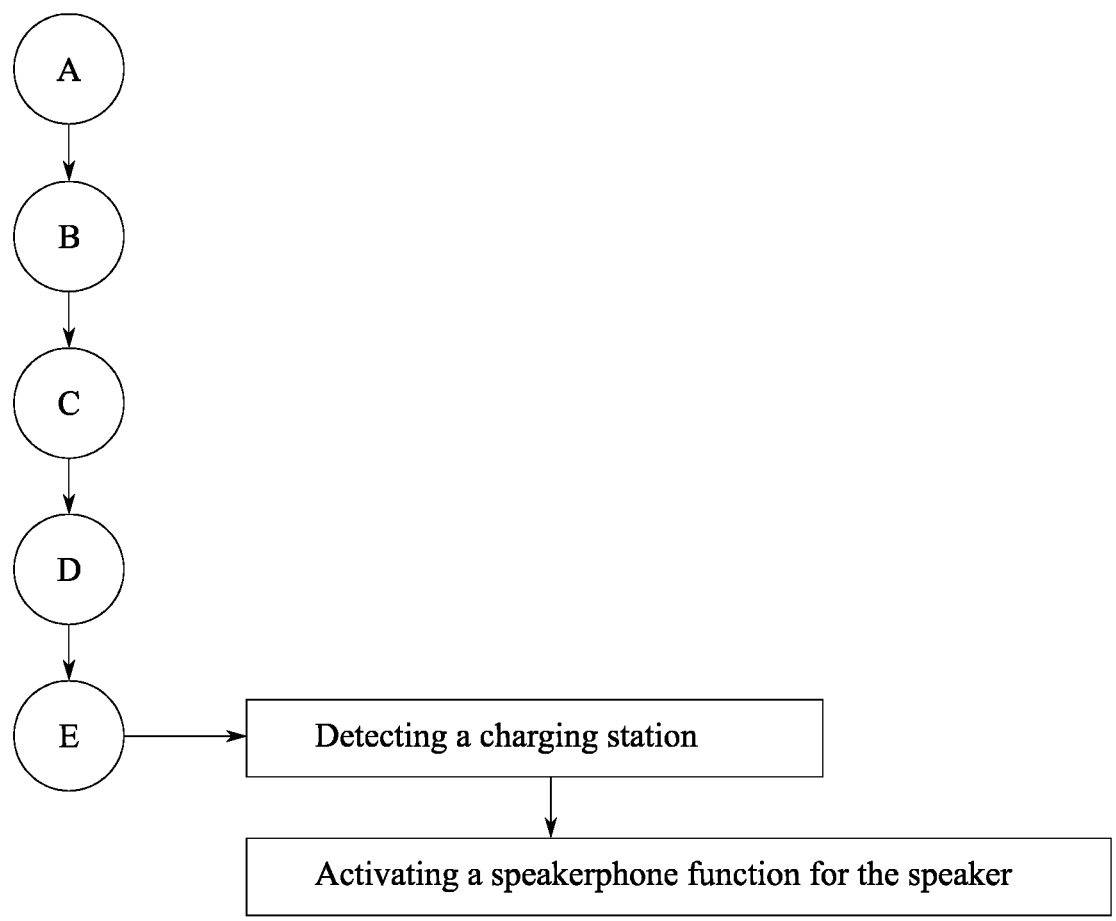
FIG. 14 is a flowchart thereof, further depicting steps for utilizing a charging station.

The present invention also utilizes a charging station 6. The charging station 6 is a holder into which the voice only phone 1 is positioned and with which the voice only phone 1 is communicably coupled. The electronics assembly 3 further comprises a dock monitor 35 that is communicably connected to the charging station 6 and is electronically connected to the microprocessor 31, as depicted in FIG. 3. In this way, when the voice only phone 1 is positioned within the charging station 6 as shown in FIG. 5, the dock monitor 35 is able to detect the presence of the charging station 6 and in turn activate a speaker phone function for the speaker 32 by signaling the microprocessor 31, as depicted in FIG. 14. When the voice only phone 1 is removed from the charging station 6, the dock monitor 35 detects the absence of the charging station 6 and the speakerphone function is disabled.

The dock monitor 35 provides a wireless means of communicating with the charging station 6. The dock monitor 35 is positioned within the phone case 2, such that there is no physical connection, such as a port, between the voice only phone 1 and the charging station 6. As such, there are no holes through the phone case 2 through which dust, water, etc. can enter the phone case 2 and internally damage the voice only phone 1. The dock monitor 35 can be a near field communication device, a radio-frequency identification device, an electromagnetic device, or any other device capable of detecting the close range presence of the charging station 6. The dock monitor 35 communicates with a subsequent device within the charging station 6 using the same standard as the dock monitor 35.

The charging station 6 provides a means for wirelessly charging the battery 4. The charging station 6 is a pad or holder onto which the voice only phone 1 is positioned, wherein the battery 4 and the charging station 6 are electromagnetically coupled. The charging station 6 includes a primary coil, while a secondary coil is electrically connected to the battery 4. The secondary coil can either be built into the battery 4 or be a standalone component connected to the battery 4. When current is supplied to the primary coil and the voice only phone 1 is positioned on the charging station 6, the primary coil induces a current in the secondary coil which charges the battery 4. The ability to wirelessly charge the battery 4 means that no ports or physical connectors are needed, and as such, there are no holes through the phone case 2 through which dust, water, etc. can enter the phone case 2 and internally damage the voice only phone 1.

Another feature of the voice only phone 1 is that the voice only phone 1 is waterproof. The waterproof feature of the voice only phone 1 is due mainly to the simplistic design of the voice only phone 1. As there are no holes for charging ports, data connectors, etc. the phone case 2 is substantially sealed; the bumper 23 creating a water tight seal between the first shell 21 and the second shell 22. The only holes through the phone case are for the speaker 32, the microphone 33, and the at least one noise cancellation microphone. However, the speaker 32, the microphone 33, and the at least one noise cancellation microphone are waterproof and are connected to the interior of the phone case 2, forming a watertight seal. In this way, water or other liquids are not able to penetrate the phone case 2 and damage the electronics assembly 3 or battery 4. Furthermore, is the activation switch 5 is the push button, then the activation switch 5 is also waterproof and forms a watertight seal with the phone case 2.

In order to use the voice only phone 1, the user actuates the activation switch 5, wherein the microprocessor 31 launches the IVR. When the voice only phone is powered off, the activation switch 5 is actuated, wherein the microprocessor 31 powers on and a loading message is orated to the user through the speaker 32, such as "I am loading, please wait". With the microprocessor 31 powered on, the microprocessor 31 launches the IVR, wherein a subsequent loading message is orated to the user via the speaker 32, such as "I am loading the app, please wait". To notify the user that the IVR application has been launched, a system ready message is orated to the user through the speaker, such as "I am ready, push the button to place a call".

Once launched, the IVR is responsive to use inputs through the microphone 33. More specifically, the microprocessor 31 receives a voice input from the user through the microphone 33. The microprocessor 31 then processes the voice input according to the rule sets provided by the IVR, and initiates a virtual respondent process in response to the voice input. The virtual respondent process may include providing an output through the speaker 32, managing available functions provided by the IVR, managing the storage of data, managing communication with external devices, or any other process moderated by the IVR.

Figure 11:
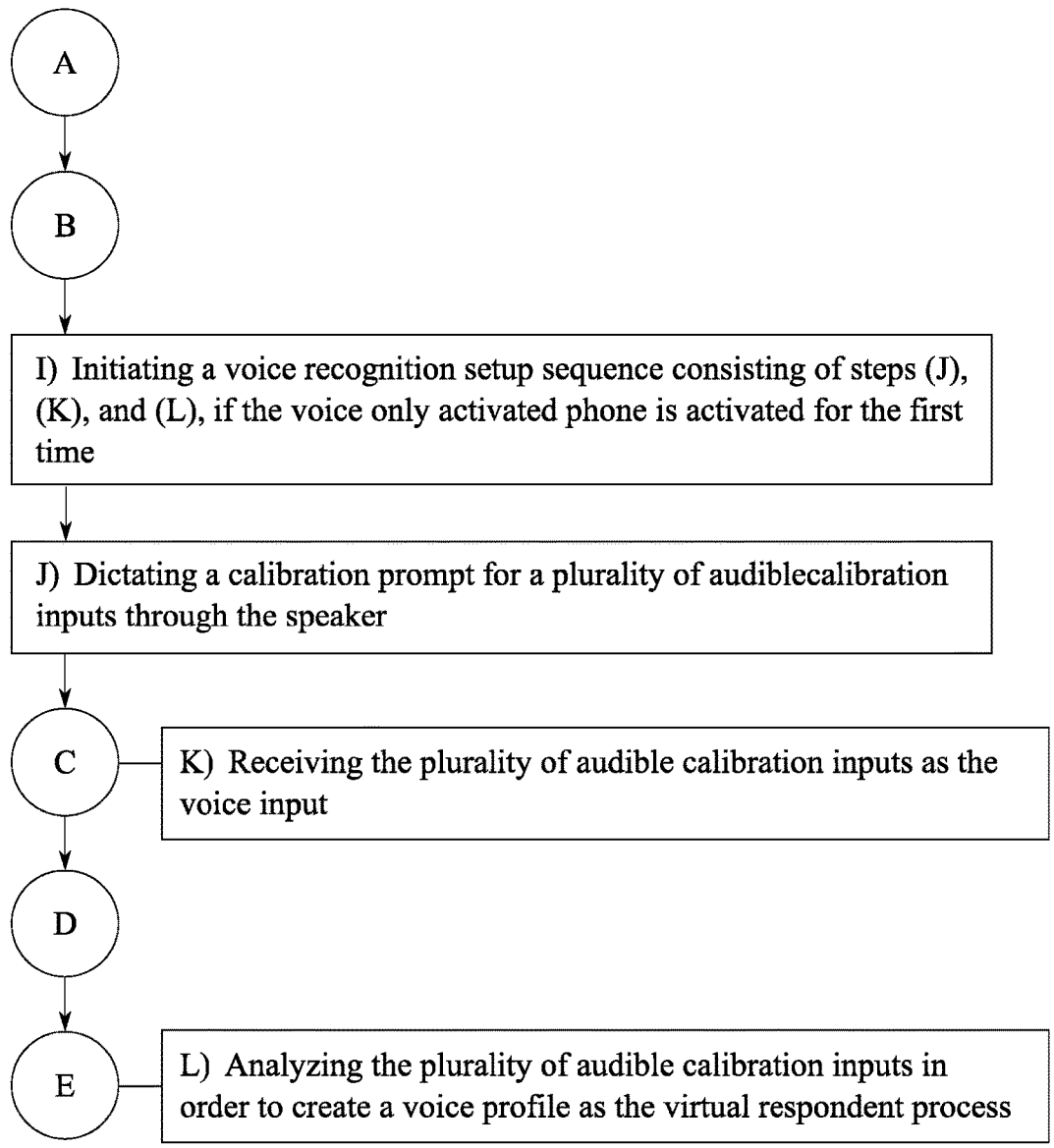
FIG. 11 is a flowchart thereof, further depicting steps for calibrating the voice only phone.

In some embodiments, when using the voice only phone 1 for the first time, the user must first create a voice profile by interacting with the IVR. The voice profile acts to calibrate the voice only phone 1, such that the IVR is able to recognize the unique voice of the user. In reference to FIG. 11-12, when the voice only phone 1 is activated for the first time, the microprocessor 31 initiates a voice recognition setup sequence to create the voice profile. The voice recognition setup sequence includes the steps of: dictating a calibration prompt for a plurality of audible calibration inputs through the speaker 32; receiving the plurality of audible calibration inputs through the microphone 33, as the voice input; and analyzing the plurality of audible calibration inputs in order to create the voice profile, as the virtual respondent process.

Figure 12:
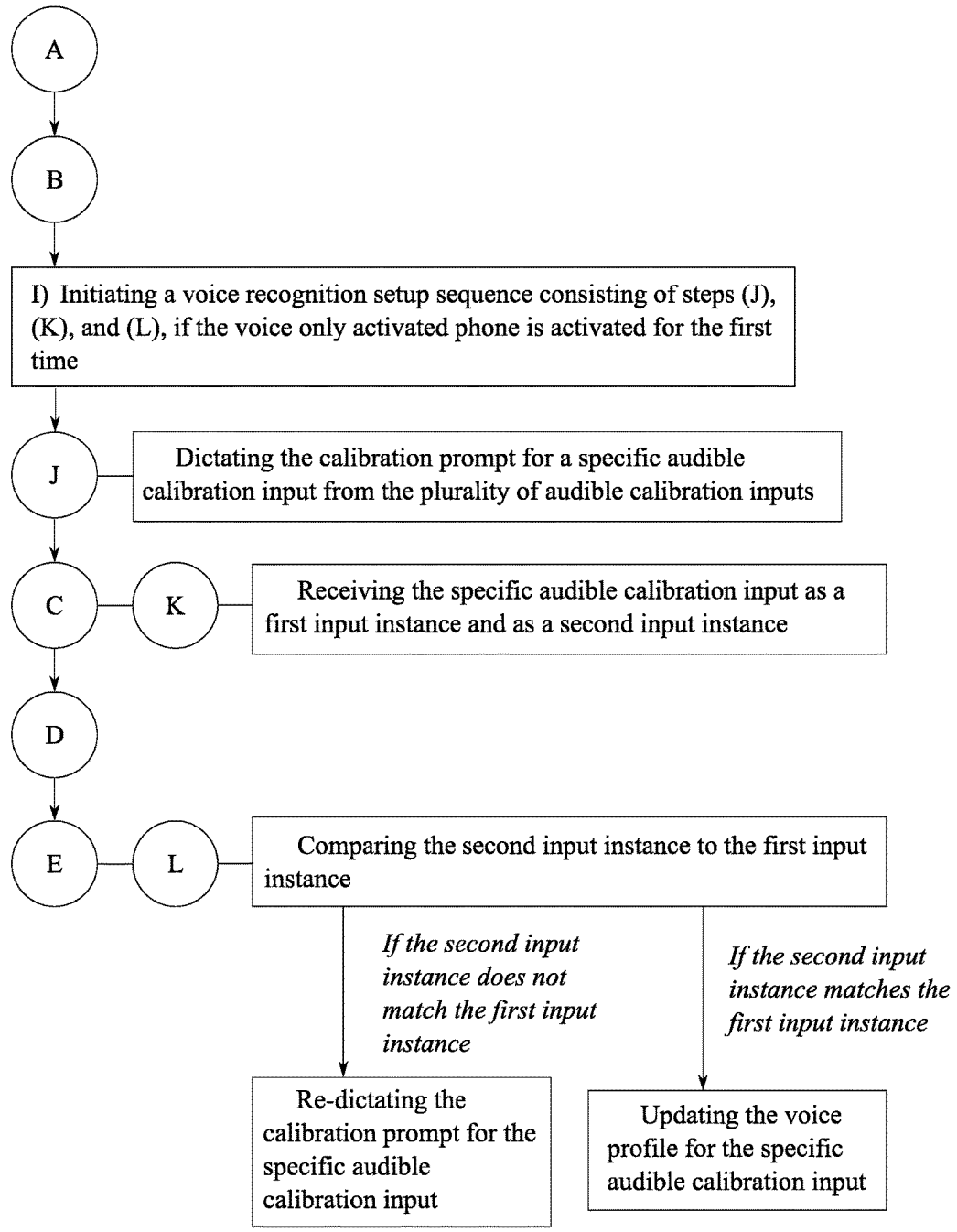
FIG. 12 is a flowchart thereof, further depicting steps for processing a specific audible calibration input in order to calibrate the voice only phone.

In reference to FIG. 12, the calibration prompt instructs the user to speak a specific audible calibration input from the plurality of audible calibration inputs. The voice only phone 1 first dictates the calibration prompt for the specific audible calibration input through the speaker 32, wherein the user orates the specific audible calibration input into the microphone 33. The voice only phone 1 receives the specific audible calibration input orated by the user as a first input instance, and then dictates the calibration prompt again, asking the user to repeat the specific audible calibration input. Again, the user orates the specific audible calibration input into the microphone 33, wherein the voice only phone 1 receives the specific audible calibration input as a second input instance.

In further reference to FIG. 12, once the voice only phone 1 has received the first input instance and the second input instance of the specific audible calibration input, the microprocessor 31 compares the second input instance to the first input instance. The second input instance is compared to the first input instance in order to determine whether or not the specific audible calibration input orated by the user is valid. If the second input instance does not match the first input instance, then the voice only phone 1 re-dictates the calibration prompt, telling the user to orate the specific audible calibration input again. If the second input instance matches the first input instance, then the microprocessor 31 updates the voice profile for the specific audible calibration input, such that the microprocessor 31 is able to recognize future input of the specific audible calibration input.

In the preferred embodiment of the preset invention, the plurality of audible calibration inputs includes the numbers 0 to 9, the word 'Yes', and the word 'No'. The voice only phone 1 first dictates the calibration prompt for the number 0, wherein the user orates the number 0 as the first input instance and the second input instance. The microprocessor 31 then compares the first input instance and the second input instance for the number 0. If the first input instance and the second input instance match, then the microprocessor 31 updates the voice profile for the number 0 in order to recognize the number 0 in the unique voice of the user at a later time. Once the steps of the voice recognition setup sequence for the number 0 are completed, the process is then repeated for the remaining numbers and words, wherein each of the plurality of audible calibration inputs is analyzed in order to create the voice profile.

In other embodiments, the voice profile is generated using only the first input instance of each of the plurality of audible calibration inputs. The calibration prompt instructs the user to speak the specific audible calibration input from the plurality of audible calibration inputs, wherein the user orates the specific audible calibration input into the microphone 33 and the voice only phone 1 receives the specific audible calibration as the first input instance. The first input instance of each of the plurality of audible calibration inputs may then be stored and used standalone or in conjunction with pre-set calibrations to form the voice profile.

If the first input instance of each of the plurality of audible calibration inputs is used in conjunction with the pre-set calibrations, then the microprocessor 31 compares the first input instance of each of the plurality of audible calibration inputs to the pre-set calibrations. The first input instance is compared to the pre-set calibrations in order to determine whether or not the specific audible calibration input orated by the user is valid. If the first input instance does not match the pre-set calibrations, then the voice only phone 1 re-dictates the calibration prompt, telling the user to orate the specific audible calibration input again. If the first input instance matches the pre-set calibrations, then the microprocessor 31 updates the voice profile for the specific audible calibration input, such that the microprocessor 31 is able to recognize future input of the specific audible calibration input.

Even after the voice profile for the user has been created through the voice recognition setup sequence, the microprocessor 31 is able to dynamically adapt the voice profile. This is to account for an unintended change in tone of the unique voice of the user. For example, if the user has a cold and resultantly a raspy voice, the voice only phone 1 may repeat the voice recognition setup sequence for all or some of the plurality of audible calibration inputs. The subsequent results of the voice recognition setup sequence can be stored separately from, or meshed with the initial results of the voice recognition setup sequence in order to adapt to the change in the unique voice of the user.

Once the voice profile has been created, the user is able to verbally communicate with the voice only phone 1. Verbal interaction with the IVR allows the user to place and accept calls, as well as build a dynamic voice phone book that is progressively updated as the user utilizes the voice only phone 1. In the preferred embodiment of the present invention, the prompts of the voice only phone 1 are limited to integer responses, or yes and no responses by the user. The limitation of the acceptable responses by the user allows for simplistic interaction with the IVR, which greatly improves voice recognition precision and in turn the overall user experience.

Figure 7:
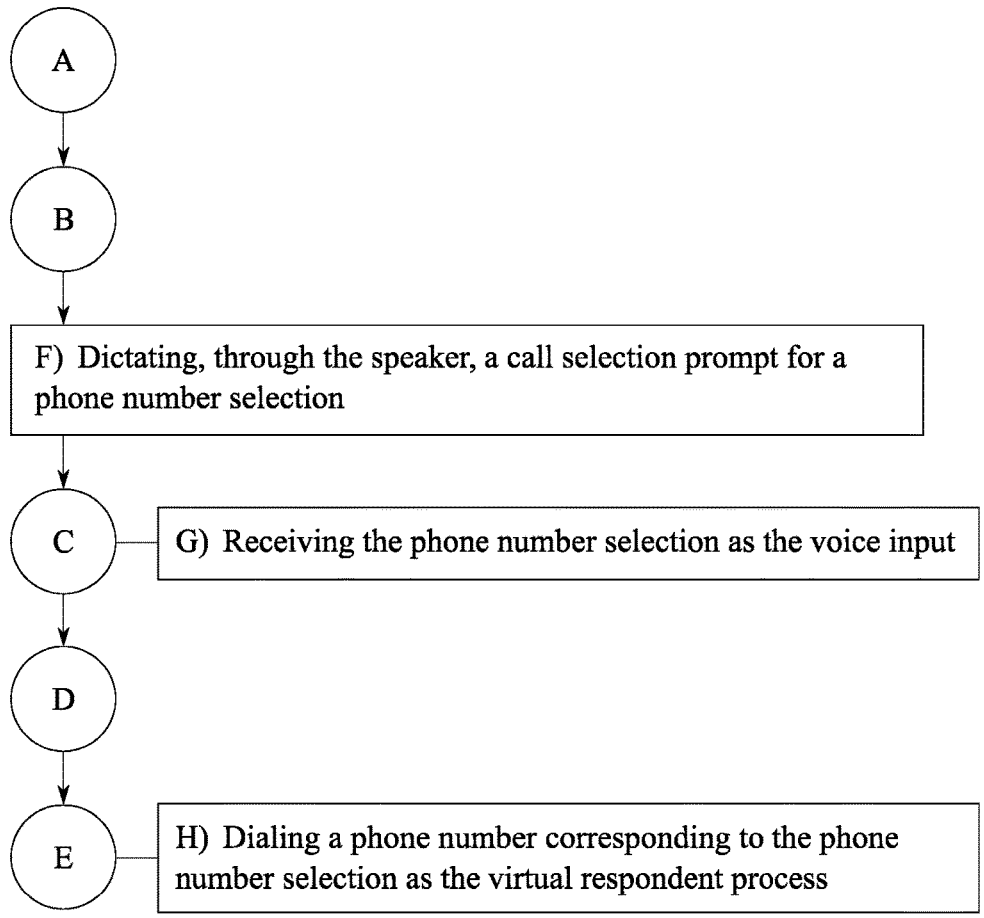
FIG. 7 is a flowchart thereof, further depicting steps for making a phone call.

In reference to FIG. 7, each subsequent time the voice only phone 1 is activated the voice only phone 1 dictates, through the speaker 32, a call selection prompt for a phone number selection. The call selection prompt instructs the user to make the phone number selection by either saying a contact name or a plurality of digits corresponding to a phone number. For example, the call selection prompt could state, "Hello. Would you like to call by name or by number?". The user dictates the method in which to make the phone number selection, and then either dictates the contact name or the plurality of digits. Upon receiving the phone number selection through the microphone 33 as the voice input, the voice only phone 1 dials the phone number corresponding to the phone number selection.

In the preferred embodiment of the present invention, the call selection prompt instructs the user to say the number 1 to make the phone number selection by name, and to say the number 2 to make the phone number selection by number. In another embodiment of the present invention, the call selection prompt may instruct the user to say "name" to make the phone number selection by name, and to say "number" to make the phone number selection by number. If the IVR cannot recognize the response to the call selection prompt, then the IVR will repeat the call selection prompt. In the preferred embodiment, the call selection prompt is repeated up to three times; if the response to the call selection prompt is not recognized after the third attempt, then the IVR will dictate an end process message, such as "Please try next time", and hang up.

In a first embodiment of making a call, if the user chooses to make the phone number selection by name, then the IVR checks dynamic voice phone book stored in memory. If the dynamic voice phone book is empty, then the IVR initiates the process for making the phone number selection by number, as outlined below. If the dynamic voice phone book is not empty, then the IVR prompts the user with a name lookup message, such as "Please say the nickname of the person you wish to call". The microprocessor 31 then analyzes the response of the user and the IVR attempts to match the response to an entry in the dynamic voice phone book. If the IVR does not recognize the contact name given by the user, then the IVR dictates a retry message, such as "I can't find this name, let's try again". If the IVR can still not identify the contact name spoken by the user after a second attempt, then the IVR directs the user to the process for making the phone number selection by number, as outlined below; giving a message such as, "Still can't find this person. Let's try to call by number".

If the IVR recognizes the contact name given by the user, then IVR checks a confidence counter for the name. If the confidence counter for the contact name is below a predetermined threshold, then IVR dictates a name confirmation message, such as "Did you mean to call <name dictated by user>?". If the user confirms that the contact name recognized by the IVR is correct, then the IVR increases the confidence counter for the contact name, dictates a dialing message such as "Calling <name dictated by user>, and proceeds to connect the call. If the user states the contact name recognized by the IVR is incorrect, then the IVR directs the user to the process for making the phone number selection by number, as outlined below; giving a message such as, "Let's try to call by number". If the confidence counter for the name is above the predetermined threshold, then the IVR dictates the dialing message and proceeds to connect the call.

If the user chooses to make the phone number selection by number, or is otherwise directed to make the phone number selection by number, the IVR prompts the user with a number input message, such as "Please say the number of the person you wish to call". The user then dictates the plurality of digits for the phone number selection. Upon receiving the plurality of digits, the IVR first checks if the plurality of digits has a preset value of digits. By default the preset value is ten digits (exact value may differ depending on country, domestic vs international calls, etc.). If the plurality of digits has less than the preset value of digits, then IVR checks the amount of attempts made to make the phone number selection by number. After the first failed attempt, the IVR prompts a retry message, such as "The number of phone digits has to be 10, let's try again. After the second failed attempt, the IVR prompts a subsequent retry message, such as "The number of phone digits has to be 10. Try to speak the number faster without pauses". After the third failed attempt, the IVR prompts a call failed message such as "I still don't get it, sorry. Let's try next time", and disconnects the call.

If the plurality of digits has the preset value of digits, then the IVR prompts a number confirmation message, such as "Did you mean this number <number dictated by user>?". The user can then respond to the number confirmation message with a "yes" or "no" response. If the user response is "no", then the IVR prompts the number input message again, wherein the user re-dictates the plurality of digits. If the user response is "yes", then the IVR checks to see if the plurality of digits is stored in the dynamic voice phone book. If the plurality of digits is stored in the dynamic voice phone book, then the IVR dictates the dialing message to the user and proceeds to connect the call.

If the plurality of digits is not stored in the dynamic voice phone book, then the IVR asks if the user would like to store the plurality of digits in the dynamic voice phone book; the IVR dictating a number storage prompt, such as "Would you like to save this number to your phone book, so next time you could call by name?". The user can then respond to the number storage prompt with a "yes" or "no" response. If the user response is "no", then the IVR dictates the dialing message to the user and proceeds to connect the call. If the user response is "yes", then the IVR prompts the user with a contact name input prompt, such as "Please say the name of the person the way it will be used to call by name". The user then dictates the contact name into the microphone 33, and the IVR attempts to recognize and correspondingly store the contact name with the plurality of digits.

If there is too much background noise when the user enters the contact name, then the IVR prompts the user to re-enter the contact name through a contact retry message such as "I hear too much noise. Please try in a quiet environment". When the IVR is able to recognize the contact name, the IVR confirms the contact name with the user through a contact confirmation message such as "Do you mean <contact name dictated by user> to be saved to your phonebook?". The user can then respond to the contact confirmation message with a "yes" or "no" response. If the user response is "no", then the IVR dictates a contact retry message such as "Let me learn it again", and repeats the name storage message, wherein the user re-dictates the contact name. If the user response is "yes", then the IVR dictates the dialing message to the user and proceeds to connect the call.

Figure 9:
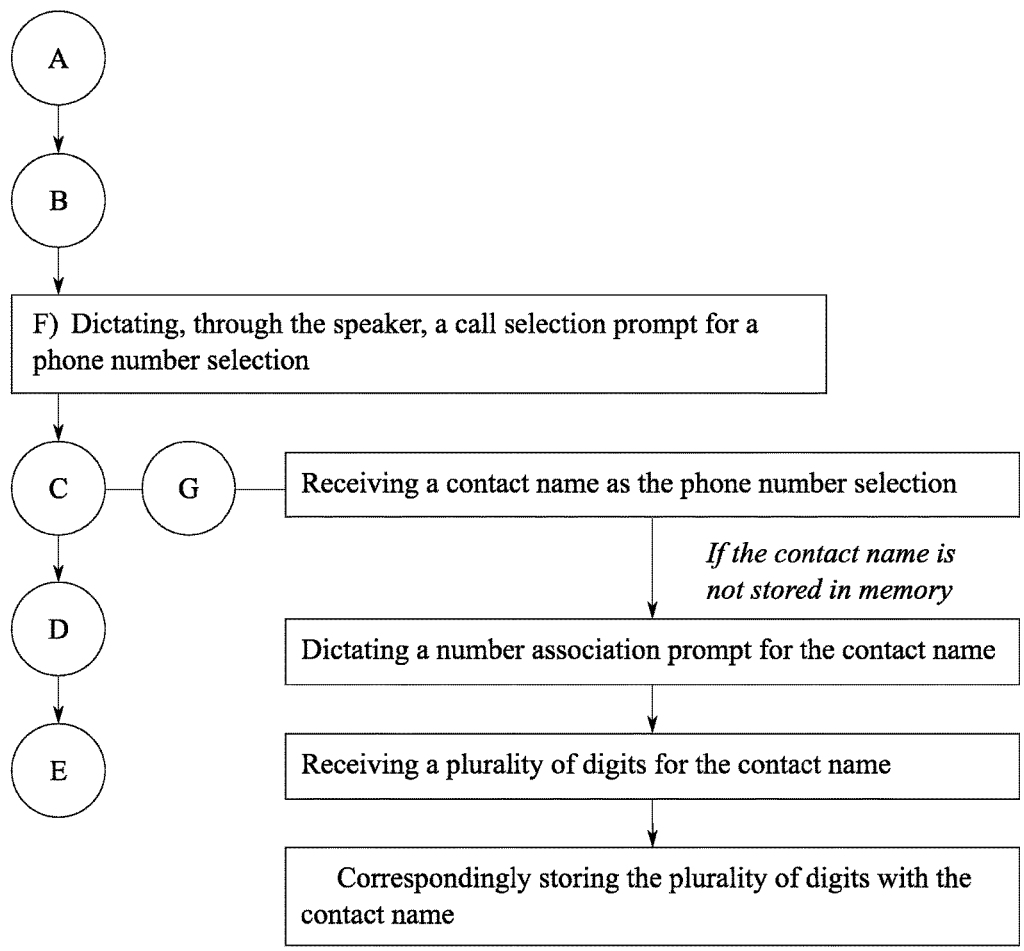
FIG. 9 is a flowchart thereof, further depicting steps for making the phone call using a contact name.

In a second embodiment of making the call, if the user chooses to make the phone number selection by name, then the user dictates the contact name through the microphone 33 as the voice input. In reference to FIG. 9, the voice only phone 1 receives the contact name as the phone number selection and checks to see if the contact name is stored in memory. If the contact name is stored in memory, then the voice only phone 1 dials the phone number corresponding to the contact name as the virtual respondent process. When the voice only phone 1 dials the phone number, the voice only phone 1 dictates the contact name to the user through the speaker 32. If the contact name is not stored in memory, then the voice only phone 1 initiates a sequence to program the contact name in memory as a part of the dynamic voice phone book.

Figure 10:
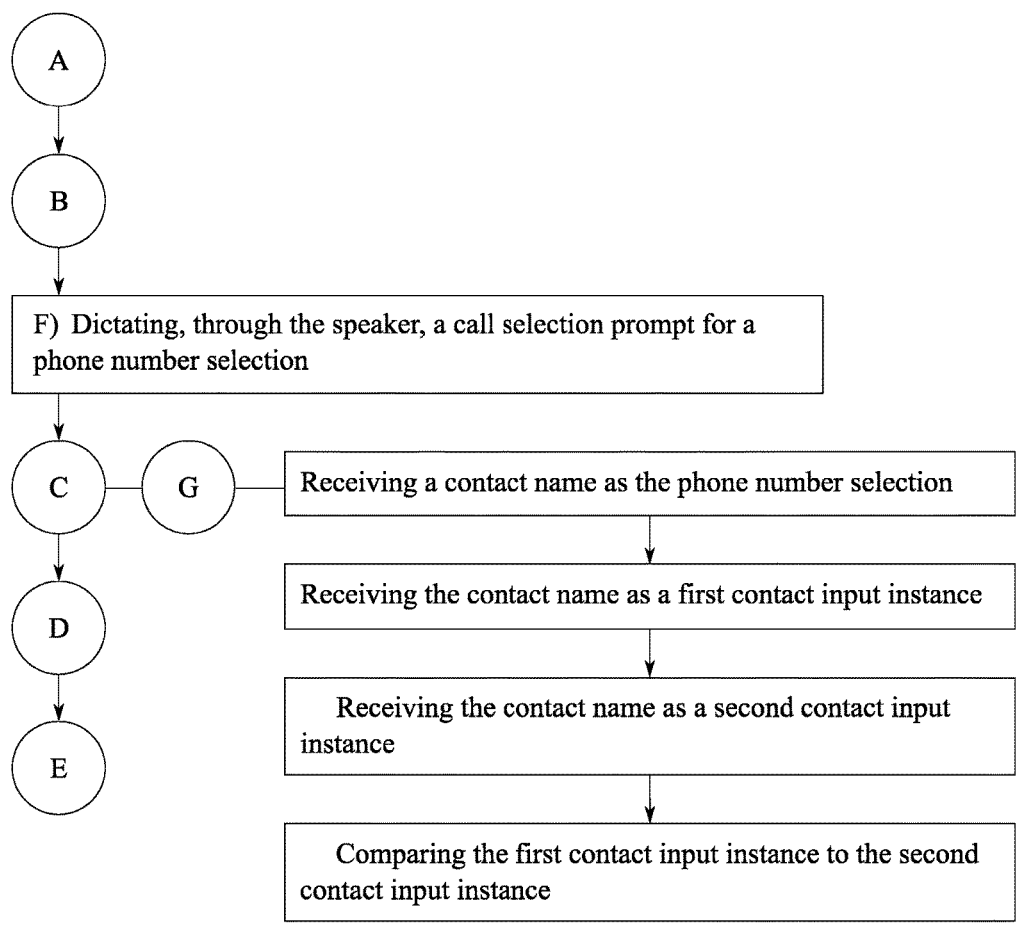
FIG. 10 is a flowchart thereof, further depicting steps for recognizing and storing the contact name by speaking the contact name multiple times.

In reference to FIG. 10, similar to programming the plurality of audible calibration inputs, the voice only phone 1 requires a first contact input instance and a second contact input instance in order to store the contact name. The original dictation of the contact name that initiates the programming sequence is received by the voice only phone 1 as the first contact input instance. The voice only phone 1 then dictates a contact name input prompt to instruct the user to repeat the contact name, wherein the user again speaks the contact name. The voice only phone 1 receives the contact name spoken for the second time as the second contact input instance, and then compares the second contact input instance to the first contact input instance.

In further reference to FIG. 10, if the second contact input instance does not match the first contact input instance, then the voice only phone 1 dictates the contact name input prompt for the contact name, instructing the user to again speak the contact name for the first contact input instance and the second contact input instance. If the second contact input instance and the first contact input instance match, then the voice only phone 1 dictates a number association prompt for the contact name. The number association prompt instructs the user to orate the plurality of digits to be stored with the contact name. The user then dictates the plurality of digits, wherein the voice only phone 1 receives the plurality of digits for the contact name and correspondingly stores the plurality of digits with the contact name. Once the contact name and the plurality of digits are correspondingly stored in memory, the user can use the contact name as the phone number selection by speaking the contact name once.

Figure 8:
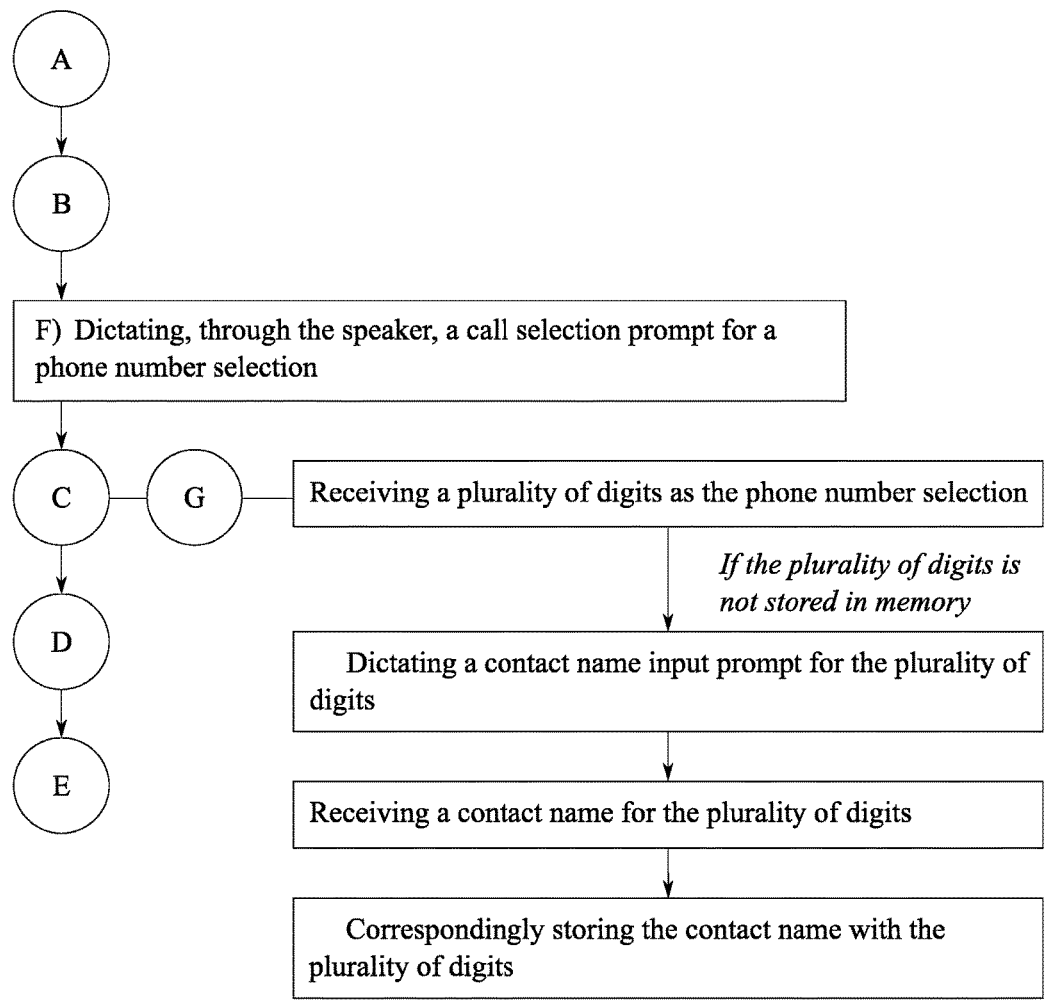
FIG. 8 is a flowchart thereof, further depicting steps for making the phone call using a plurality of digits.

In reference to FIG. 8, if the user chooses to make the phone number selection by number, then the user dictates the plurality of digits through the microphone 33 as the voice input. The voice only phone 1 receives the plurality of digits as the phone number selection and checks to see if the sequence of the plurality of digits is stored in memory. If the sequence of the plurality of digits is stored in memory, then the voice only phone 1 dials the phone number corresponding to the plurality of digits as the virtual respondent process. If the sequence of the plurality of digits is not stored in memory, then the voice only phone 1 dictates a number storage prompt, wherein the number storage prompt asks whether or not the user wants to store the plurality of digits in memory. If the user does not want to store the plurality of digits in memory, then the voice only phone 1 dials the phone number. When the voice only phone 1 dials the phone number, the voice only phone 1 dictates the plurality of digits to the user through the speaker 32. If the user wants to store the plurality of digits in memory, then the voice only phone 1 initiates a sequence to program the plurality of digits in memory as a part of the dynamic voice phone book.

In further reference to FIG. 8, to program the sequence of the plurality of digits into memory, the voice only phone 1 dictates the contact name input prompt, instructing the user to speak the contact name for the plurality of digits. If the contact name is not stored in memory, then the voice only phone 1 initiates the sequence to program the contact name in memory, wherein the voice only phone 1 receives the contact name as the first contact input instance and the second name input sequence. Upon receiving the contact name for the plurality of digits and successfully comparing the second contact input instance to the first contact input instance, the voice only phone 1 correspondingly stores the contact name with the plurality of digits. If the contact name already exists in memory, then the voice only phone 1 dictates a contact update prompt instructing the user to select between replacing the plurality of digits currently associated with the contact name and choosing a subsequent contact name. Once the contact name and the plurality of digits are correspondingly stored in memory, the user can use the contact name as the phone number selection by speaking the contact name once.

In yet further reference to FIG. 8, if the plurality of digits is less than the preset value of digits, or is otherwise not a valid phone number, then the voice only phone 1 dictates a retry call selection prompt for the phone number selection. In the preferred embodiment, the preset value of digits is 10 for calls within the United States, however, the preset value of digits may be different for international calls. The retry call selection prompt asks whether or not the user would like to attempt to dictate the plurality of digits again. The user then dictates a retry response being either 'Yes' or 'No' for the phone number selection. The voice only phone 1 receives the retry response and takes the appropriate action. If the retry response is 'Yes', then the voice only phone 1 prompts the user to dictate the plurality of digits again. If the retry response is 'No', then the voice only phone 1 disconnects the call and goes "on the hook".

When the voice only phone 1 receives an incoming call, the IVR checks if the incoming number is stored in the dynamic voice phone book. If the incoming number is stored in the dynamic voice phone book, then the IVR dictates a call by contact name message, wherein the IVR dictates the contact name to the user through the speaker 32. For example, the call by contact name message may dictate, "You have a call from <contact name stored in dynamic voice phone book>". If the incoming number is not stored in the dynamic voice phone book, then the IVR dictates a call by number message, wherein the IVR dictates the digits of the incoming number to the user through the speaker 32. For example, the call by number message may dictate, "You have a call from <digits of the incoming number>".

Figure 17:
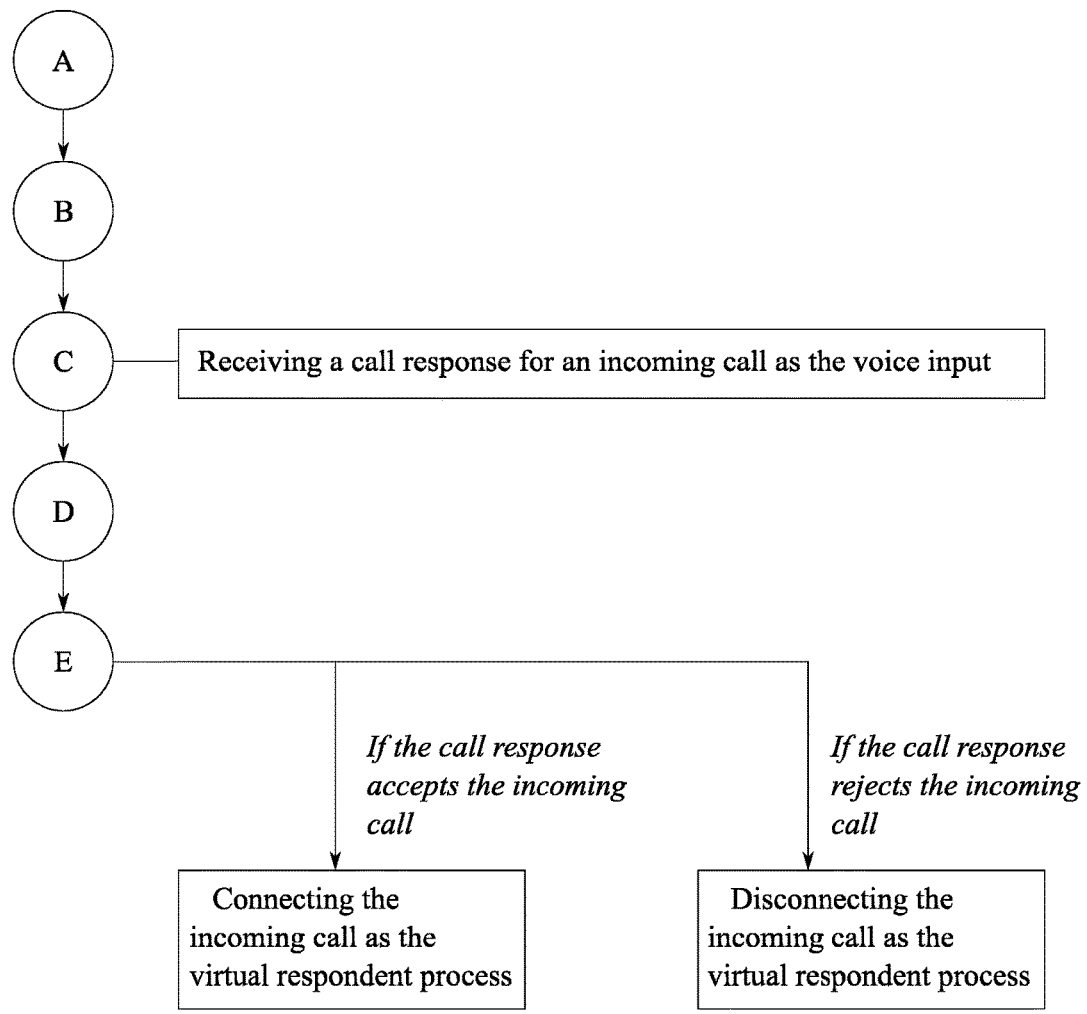
FIG. 17 is a flowchart thereof, further depicting steps for connecting or disconnecting an incoming call.

In reference to FIG. 17, the user then engages the activation switch 5 in order to accept or deny the incoming call. Upon engagement of the activation switch 5, the voice only phone 1 dictates a call accept prompt, wherein the call accept prompt asks whether or not the user wants to accept the incoming call. The user then dictates a call response being either 'Yes' or 'No' for the incoming call. The voice only phone 1 receives the call response as the voice input, and takes the appropriate action. If the call response is 'Yes', then the voice only phone 1 accepts the call and connects the incoming call as the virtual respondent process. If the call response is 'No', then the voice only phone 1 rejects the call and disconnects the incoming call as the virtual respondent process.

If the incoming call is accepted and the incoming number is not stored in the dynamic voice phone book, then the IVR dictates the number storage message once the incoming call has been disconnected. If the use response is "yes", then the IVR prompts the name storage message and proceeds to learn the contact name to be associated with the incoming number.

Figure 13:
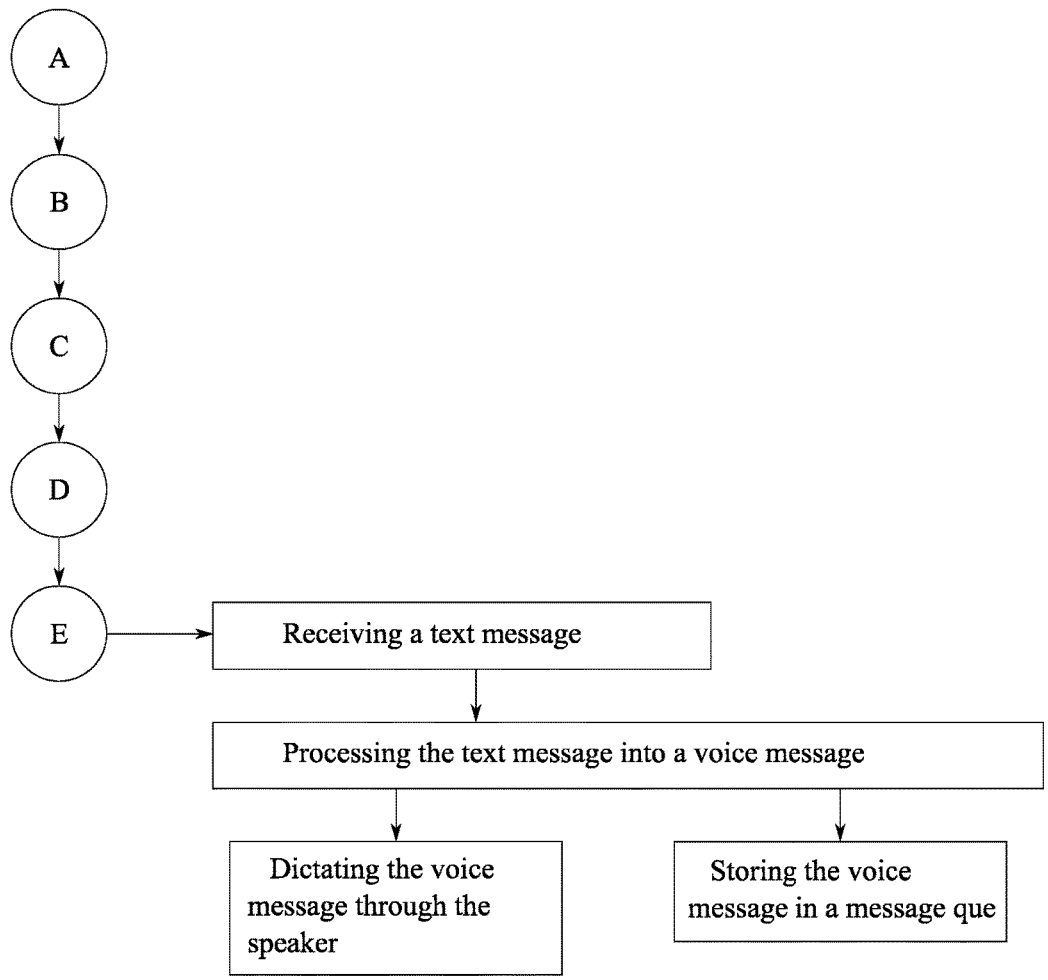
FIG. 13 is a flowchart thereof, further depicting steps for receiving and processing a text message.

In reference to FIG. 13, the voice only phone 1 is also capable of receiving and dictating text messages. When the voice only phone 1 receives the text message from another device (e.g. using the Short Messaging Service standard), the voice only phone 1 processes the text message into a voice message through the microprocessor 31. The voice only phone 1 then dictates a message selection prompt, wherein the message selection prompt asks whether or not the user wants to listen to the voice message. The user then dictates a message response being either 'Yes' or 'No' for the voice message. The voice only phone 1 receives the message response and takes the appropriate action. In reference to FIG. 13, if the message response is 'No', then the voice only phone 1 stores the voice message in a message queue, wherein the user can access the voice message at a later time. In the preferred embodiment of the present invention, the voice only phone 1 dictates the message selection prompt each time the voice only phone 1 is activated, if there are any voice messages in the message queue.

Figure 15:
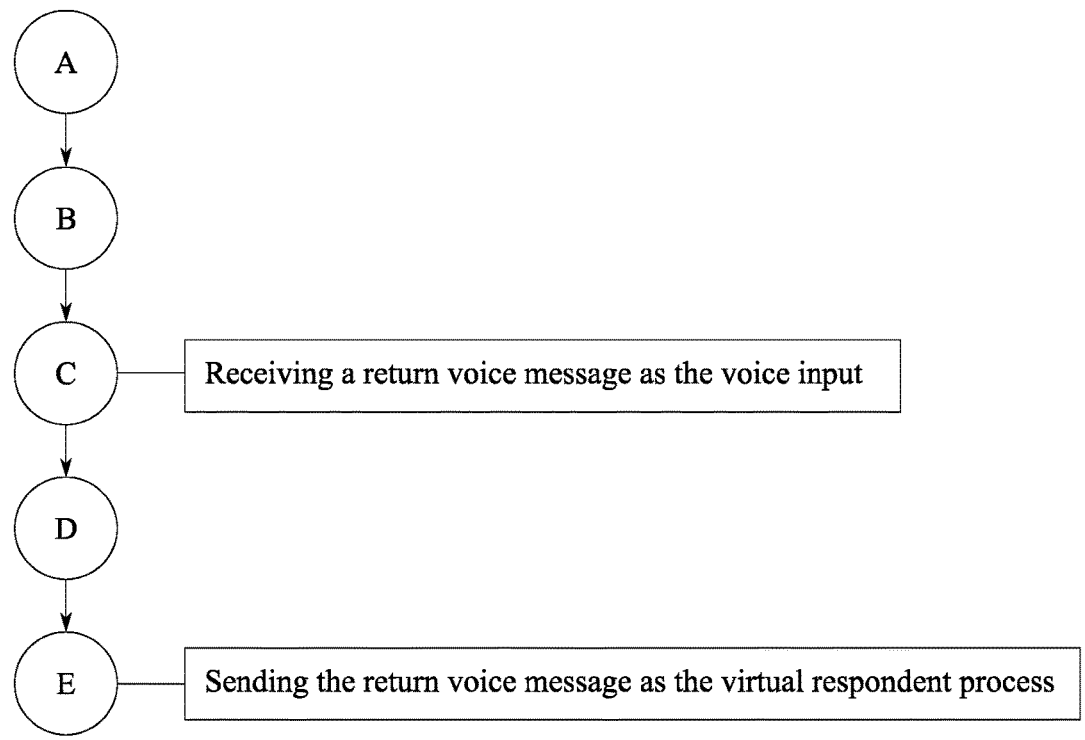
FIG. 15 is a flowchart thereof, further depicting steps for sending a return voice message.

In reference to FIG. 13, if the message response is 'Yes', then the voice only phone 1 dictates the voice message through the speaker 32. Once the voice message has been dictated to the user, the voice only phone 1 dictates a message reply prompt. The message reply prompt asks whether or not the user would like to send a return voice message in response to the text message. The user then dictates a message reply response being either 'Yes' or 'No' for sending the return voice message. The voice only phone 1 receives the message reply response and takes the appropriate action. In reference to FIG. 15, if the message reply response is 'Yes', then the voice only phone 1 prompts the user to dictate the return voice message. The voice only phone 1 receives the return voice message through the microphone 33 as the voice input and then sends the return voice message to the other device as the virtual respondent process. If the message reply response is 'No', then the voice only phone 1 disconnects the call and goes "on the hook". In the preferred embodiment of the present invention, the return voice message is sent by the Multimedia Messaging Service standard.

The voice only phone also supports a 'find me' feature in which the voice only phone 1 is programmed to respond to a specific phrase. The electronics assembly 3 may further comprise a specialized microphone to be used with the 'find me' feature, or the microphone 33 may be used. Similar to the microphone 33, the specialized microphone is electrically connected to the microprocessor 31. Additionally, the specialized microphone is waterproof and forms a water tight seal with the interior of the phone case 2 to prevent any water or other liquids from entering the phone case 2.

The voice only phone 1 prompts the user though the IVR to orate the specific phrase into the microphone 33, or the specialized microphone configured for the 'find me' feature. When the voice only phone 1 receives the specific phrase through the microphone 33, or the specialized microphone, the voice only phone 1 stores the specific phrase in memory. In order to use the 'find me' feature, power is constantly supplied to either the microphone 33 or the specialized microphone. If the microphone 33 or the specialized microphone detect a human voice, then the microprocessor 31 is powered on. The microprocessor 31 then processes the human voice(s), searching for the specific phrase.

Figure 18:
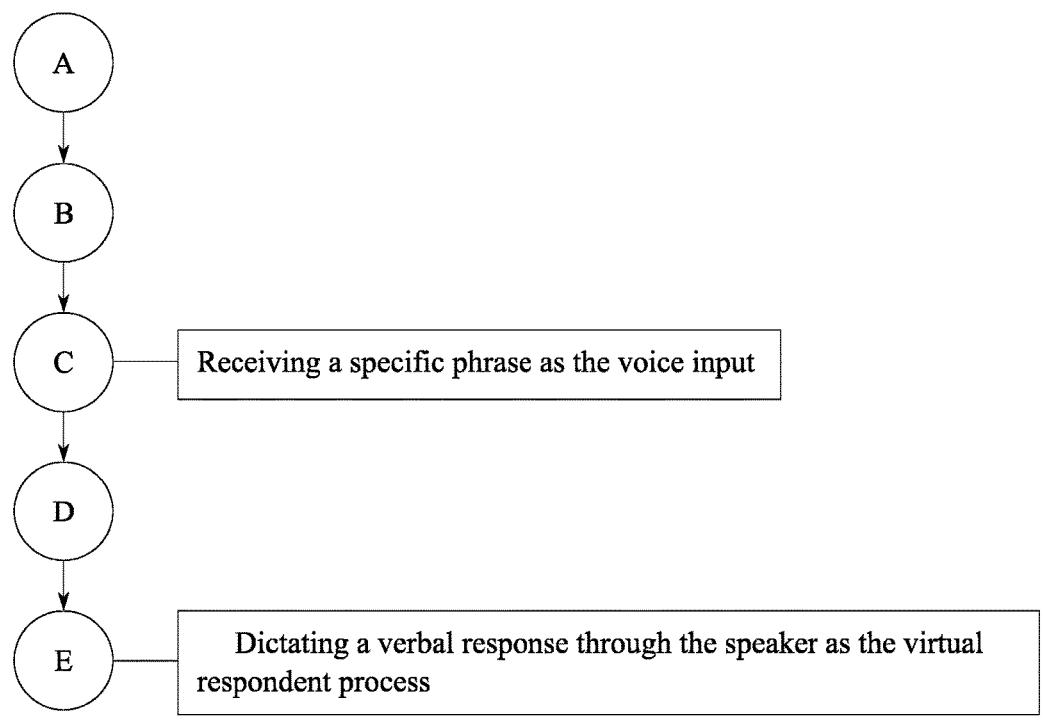
FIG. 18 is a flowchart thereof, further depicting steps for utilizing a "find me" feature of the voice only phone.

If the microprocessor 31 does not detect the specific phrase and the microphone 33 or the specialized microphone stop detecting human voice(s), then the microprocessor 31 powers off. In reference to FIG. 18, if the microprocessor 31 does detect the specific phrase as the voice input, then the microprocessor 31 initiates a verbal response as the virtual respondent process. The microprocessor 31 signals the speaker 32 to dictate the verbal response, such that the user or another individual is able to locate the voice only phone. The 'find me' feature is configured to detect the specific phrase in the voice of any individual and not just the user. For example, if the specific phrase is 'Just Phone' and the microprocessor 31 detects the specific phrase in any voice, then the voice only phone 1 dictates the verbal response such as 'I am here, I am here'.

Figure 19:
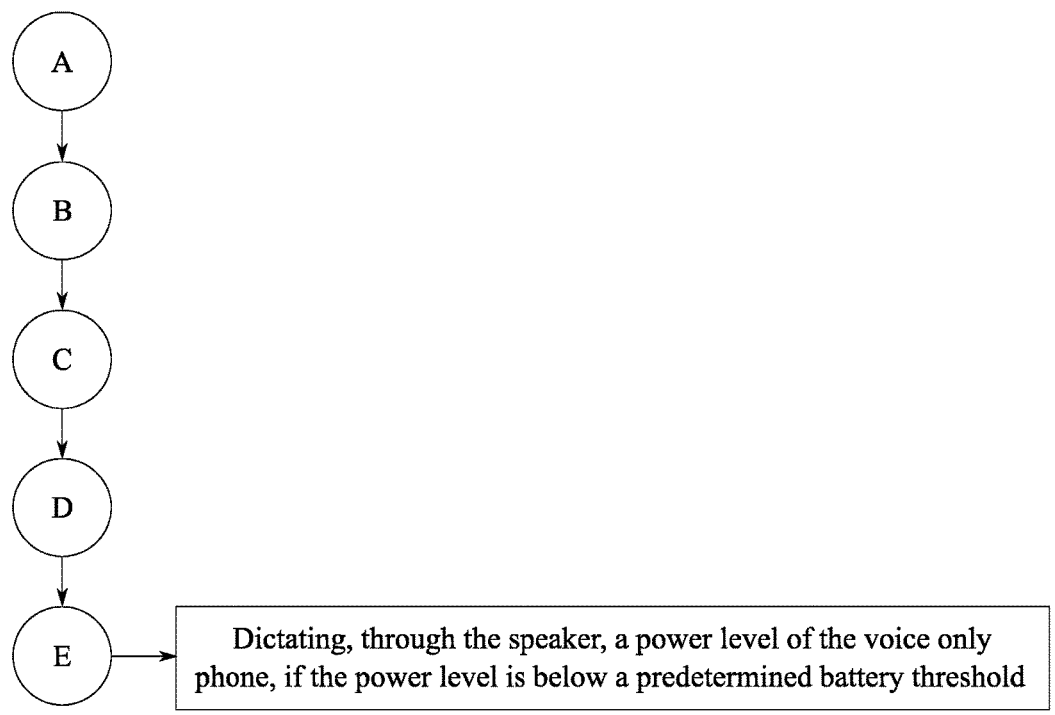
FIG. 19 is a flowchart thereof, further depicting steps for dictating a power level to the user.

In reference to FIG. 19, another feature of the voice only phone 1 is a low battery warning. When the battery 4 is low (e.g. 10% power, 5% power, 1%), the voice only phone 1 will announce a verbal message to the user. More specifically, when a power level of the battery 4 is below a predetermined battery threshold, the power level is dictated through the speaker 32 as the verbal message. The verbal message can be initiated in two different ways. The first way to initiate the verbal message is by engaging the activation switch 5, after which the voice only phone 1 will dictate the verbal message indicating the battery 4 being low prior to dictating any other prompts. The second way to initiate the verbal message is if the microphone 33 or the specialized microphone detect a human voice, wherein the microphone 33 or the specialized microphone is always powered on. Upon detecting the human voice, the microprocessor 31 is powered on and the verbal message indicating the battery 4 being low is dictated.

Figure 20:
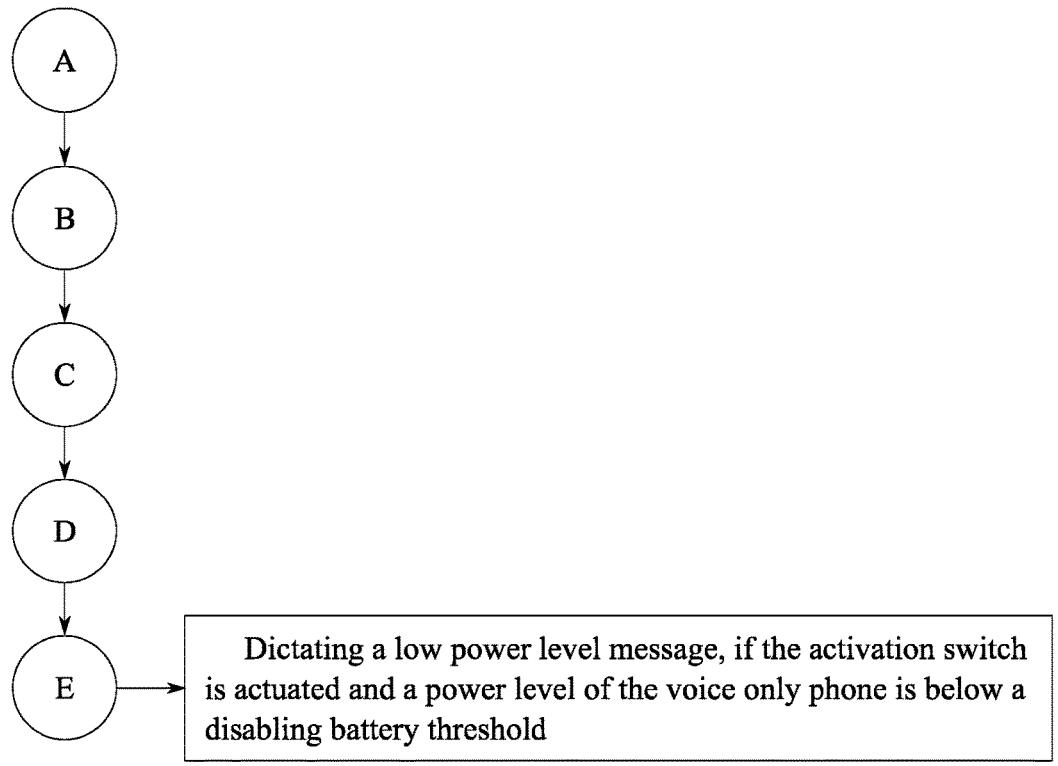
FIG. 20 is a flowchart thereof, further depicting steps dictating a low power level message to the user, wherein the interactive virtual respondent is active but in a limited capacity, and wherein placing and receiving calls is disabled.

In reference to FIG. 20, in some embodiments, the voice only phone 1 also uses a disabling battery threshold. The disabling battery threshold indicates a very low amount of remaining power in the battery 4. In order to prevent the battery 4 from completely discharging, the microprocessor 31 disables functions of the IVR if the power level falls below the disabling battery threshold, such as disabling the ability to place or receive a call. When the power level is below the disabling battery threshold, if the user actuates the activation switch 5, then the microprocessor 31 dictates a low power level message to the user to notify the user that features have been temporarily disabled until the battery 4 is charged. For example, the low power level message may dictate, "Cannot place/receive the call, the battery level is too low. Please place the phone to the charger". In this way, the IVR remains active but only in a limited capacity.

Different battery level messages may be dictated to the user depending on whether or not the voice only phone 1 is positioned on the charging station 6. For example, when the voice only phone 1 is placed on the charging station 6, a charging message may be dictated, such as "Charging. The battery is <charge value>% full. Estimated time for full charge is <number of minutes>". When the voice only phone 1 is removed from the charging station 6, a battery level message may be dictated, such as "Charged to <charge value>%. Estimated talk time is <number of minutes/seconds>".

Figure 16:
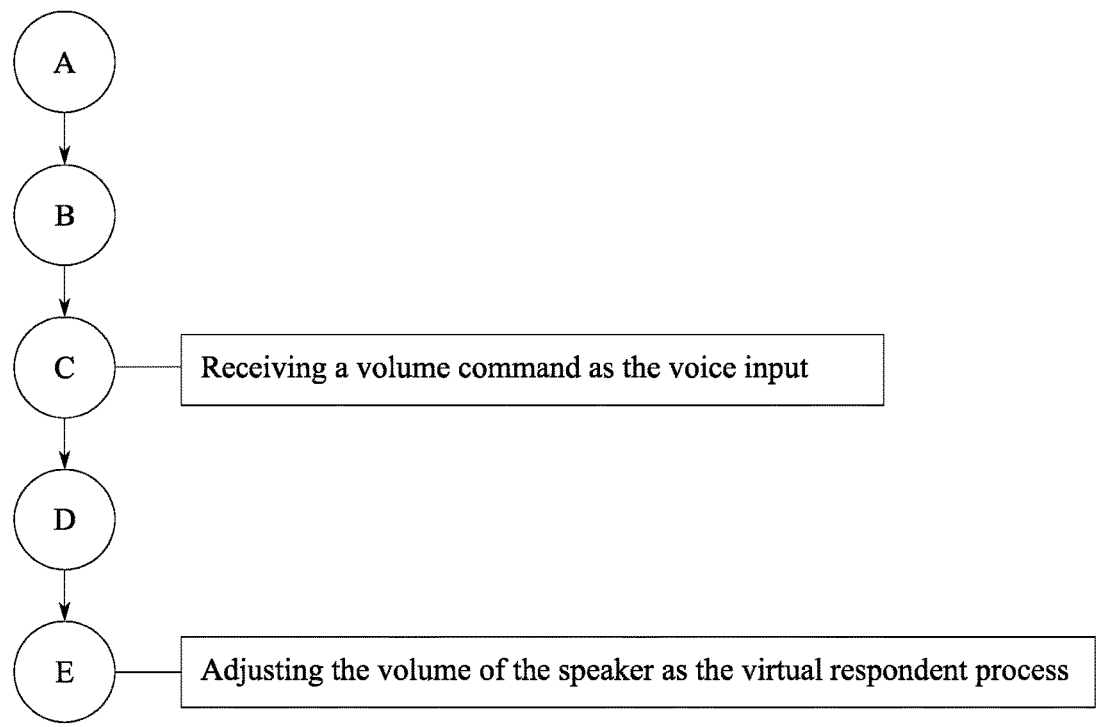
FIG. 16 is a flowchart thereof, further depicting steps for adjusting the volume via voice commands.

In reference to FIG. 16, the voice only phone 1 also allows the user to adjust the volume of the speaker 32 using a voice command. The user dictates the voice command to the microphone 33, wherein the microprocessor 31 receives the volume command as the voice input. The microprocessor 31 then adjusts the volume of the speaker 32 according to the voice command, as the virtual respondent process. For example, if the volume command is 'down', then microprocessor 31 lowers the volume of the speaker 32; if the volume command is 'up', then the microprocessor increases the volume of the speaker 32.

Although the invention has been explained in relation to its preferred embodiment, it is to be understood that many other possible modifications and variations can be made without departing from the spirit and scope of the invention as hereinafter claimed.

What is claimed is:

1. A method for operating a voice only phone by executing computer-executable instructions stored on a non-transitory computer-readable medium, the method comprising:
   providing a microprocessor, the microprocessor being configured to operate an interactive virtual respondent, a speaker and a microphone;
   creating, by the microprocessor, a dynamic voice phone book;
   storing, by the microprocessor, the dynamic voice phone book in a memory;
   launching, by the microprocessor, the interactive virtual respondent in response to an actuation of an activation switch;
   dictating, through the speaker, a call selection prompt for a phone number selection;
   receiving, by the microprocessor, a voice input through the microphone;
   receiving the phone number selection as the voice input;
   receiving a plurality of digits or a contact name as the phone number selection;
   checking, by the interactive virtual respondent, the dynamic voice phone book stored in the memory in response to receiving the plurality of digits or the contact name as the phone number selection;
   recognizing, by the interactive virtual respondent, the plurality of digits or the contact name in response to checking the dynamic voice phone book;
   progressively updating, by the microprocessor, the dynamic voice phone book through storing the plurality of digits or the contact name in the dynamic voice phone book in response to the interactive virtual respondent failing to recognize the plurality of digits or the contact name;
   processing, by the microprocessor, the voice input according to the interactive virtual respondent;
   initiating, by the microprocessor, a virtual respondent process in response to the voice input;
   checking, by the interactive virtual respondent, a confidence counter for the plurality of digits or the contact name in response to recognizing the plurality of digits or the contact name;
   dictating, by the interactive virtual respondent, a confirmation message in response to the confidence counter for the plurality of digits or the contact name being below a predetermined threshold; and
   increasing, by the interactive virtual respondent, the confidence counter for the plurality of digits or the contact name in response to the confirmation message being replied with a statement of correction.

2. The method as claimed in claim 1 comprising:
   dialing a phone number corresponding to the phone number selection as the virtual respondent process.

3. The method as claimed in claim 1 comprising:
   dictating a contact name input prompt for the plurality of digits in response to receiving the plurality of digits as the phone number selection and the plurality of digits being not stored in the memory;

receiving a contact name for the plurality of digits in response to dictating the contact name input prompt for the plurality of digits; and correspondingly storing the contact name with the plurality of digits.

4. The method as claimed in claim 1 comprising:

receiving the contact name as a first contact input instance and receiving the contact name as a second contact input instance in response to receiving the contact name as the phone number selection; and comparing the first contact input instance to the second contact input instance.

5. The method as claimed in claim 1 comprising:

dictating a number association prompt for the contact name in response to receiving the contact name as the phone number selection and the contact name being not stored in the memory;

receiving a plurality of digits for the contact name in response to dictating the number association prompt for the contact name; and correspondingly storing the plurality of digits with the contact name.

6. The method as claimed in claim 1 comprising:

initiating a voice recognition setup sequence in response to the voice only activated phone being activated for the first time, the voice recognition setup sequence consisting of:

dictating a calibration prompt for a plurality of audible calibration inputs through the speaker;

receiving the plurality of audible calibration inputs as the voice input; and analyzing the plurality of audible calibration inputs in order to create a voice profile as the virtual respondent process.

7. The method as claimed in claim 6 comprising:

dictating the calibration prompt for a specific audible calibration input from the plurality of audible calibration inputs;

receiving the specific audible calibration input as a first input instance;

receiving the specific audible calibration input as a second input instance; and comparing the second input instance to the first input instance.

8. The method as claimed in claim 7 comprising:

re-dictating the calibration prompt for the specific audible calibration input in response to the second input instance not matching the first input instance.

9. The method as claimed in claim 7 comprising:

updating the voice profile for the specific audible calibration input in response to the second input instance matching the first input instance.

10. The method as claimed in claim 1 comprising:

receiving a text message;

processing the text message into a voice message; and dictating the voice message through the speaker.

11. The method as claimed in claim 1 comprising:

receiving a text message;

processing the text message into a voice message; and storing the voice message in a message queue.

12. The method as claimed in claim 1 comprising:

receiving a return voice message as the voice input; and sending the return voice message as the virtual respondent process.

13. The method as claimed in claim 1 comprising:

detecting a charging station; and activating a speakerphone function for the speaker.

14. The method as claimed in claim 1 comprising:

receiving a volume command as the voice input; and adjusting a volume of the speaker as the virtual respondent process.

15. The method as claimed in claim 1 comprising:

receiving a call response for an incoming call as the voice input;

connecting the incoming call as the virtual respondent process in response to the call response accepting the incoming call; and disconnecting the incoming call as the virtual respondent process in response to the call response rejecting the incoming call.

16. The method as claimed in claim 1 comprising:

dictating, through the speaker, a power level of the voice only phone in response to the power level being below a predetermined battery threshold.

17. The method as claimed in claim 1 comprising:

dictating a low power level message in response to the activation switch being actuated and a power level of the voice only phone being below a disabling battery threshold.

18. The method as claimed in claim 1 comprising:

receiving a specific phrase as the voice input; and dictating a verbal response through the speaker as the virtual respondent process.

* * * * *